US011379573B2

(12) United States Patent
Li et al.

(10) Patent No.: US 11,379,573 B2
(45) Date of Patent: Jul. 5, 2022

(54) TRUSTED APPLICATION ACCESS CONTROL METHOD AND TERMINAL

(71) Applicant: HUAWEI TECHNOLOGIES CO., LTD., Guangdong (CN)

(72) Inventors: Guoqing Li, Shenzhen (CN); Xinmiao Chang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 223 days.

(21) Appl. No.: 16/629,948

(22) PCT Filed: Oct. 27, 2017

(86) PCT No.: PCT/CN2017/108068
§ 371 (c)(1),
(2) Date: Jan. 9, 2020

(87) PCT Pub. No.: WO2019/010863
PCT Pub. Date: Jan. 17, 2019

(65) Prior Publication Data
US 2020/0151320 A1 May 14, 2020

(30) Foreign Application Priority Data
Jul. 13, 2017 (CN) .......................... 201710571054.7

(51) Int. Cl.
G06F 21/44 (2013.01)
G06F 21/60 (2013.01)
G06F 21/62 (2013.01)

(52) U.S. Cl.
CPC ............ G06F 21/44 (2013.01); G06F 21/604 (2013.01); G06F 21/629 (2013.01)

(58) Field of Classification Search
CPC ....... G06F 21/44; G06F 21/604; G06F 21/629
(Continued)

(56) References Cited

U.S. PATENT DOCUMENTS 10,764,752 B1 * 9/2020 Avetisov ............... H04W 12/08
2014/0283006 A1 9/2014 Korkishko et al.
(Continued)

FOREIGN PATENT DOCUMENTS

CA 2587879 A1 * 7/2006 ............. G06Q 40/04
CN 100405760 C * 7/2008 ............. H04L 67/02
(Continued)

OTHER PUBLICATIONS

Gjerdrum et al., "Diggi: A Secure Framework for Hosting Native Cloud Functions with Minimal Trust", IEEE, doi: 10.1109/TPS-ISA48467.2019.00012, 2019, pp. 18-27. (Year: 2019).*
(Continued)

Primary Examiner — Peter C Shaw
(74) Attorney, Agent, or Firm — Womble Bond Dickinson (US) LLP

(57) ABSTRACT

Embodiments of the present invention relate to a trusted application access control method and a terminal. The method includes: receiving, by a terminal in a TEE, a request for accessing a target trusted application (TA) that is sent by a client application (CA); determining, by the terminal, a service level of the CA in a trusted execution environment (TEE) based on the request for accessing the target TA; and providing, by the terminal in the TEE by using the target TA, a service corresponding to the service level for the CA. In this way, the target TA provides different levels of services for the CA, and determines, in the TEE, the service level corresponding to the CA, thereby enhancing constraint and limitation of accessing the target TA by the CA, and improving security of accessing the target TA by the CA.

17 Claims, 7 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2016/0239649 A1 | | 8/2016 | Zhao |
| 2017/0039380 A1 | | 2/2017 | Zeuthen |
| 2017/0103382 A1 | | 4/2017 | Kim et al. |
| 2018/0096412 A1* | | 4/2018 | Scott-Nash ............. G06F 21/57 |
| 2019/0073227 A1* | | 3/2019 | Zhong ..................... G06F 9/445 |
| 2019/0318087 A1 | | 10/2019 | Chen et al. |

FOREIGN PATENT DOCUMENTS

| | | | | | |
|---|---|---|---|---|---|
| CN | 104765612 A | | 7/2015 | | |
| CN | 105335673 A | | 2/2016 | | |
| CN | 105512576 A | | 4/2016 | | |
| CN | 105809036 A | | 7/2016 | | |
| CN | 105843653 A | | 8/2016 | | |
| CN | 105978917 A | | 9/2016 | | |
| CN | 105978920 A | | 9/2016 | | |
| CN | 106034120 A | | 10/2016 | | |
| CN | 107040513 A | * | 8/2017 | ......... | H04L 63/0442 |
| EP | 3293656 A1 | * | 3/2018 | ............ | G06F 21/52 |
| JP | 2003076585 A | * | 3/2003 | ............ | G06F 21/57 |
| KR | 20110009129 A | * | 1/2011 | ............ | G06F 21/20 |
| WO | WO-0111451 A1 | * | 2/2001 | ............ | H04L 63/105 |
| WO | 2016133624 A1 | | 8/2016 | | |

OTHER PUBLICATIONS

Qiu et al., "Integrity Measurement Model Based on Trusted Virtual Platform", IEEE, doi: 10.1109/ICGEC.2010.225, 2010, pp. 526-529. (Year: 2010).*

Zhou et al., "RAitc: Securely Auditing the Remotely Executed Applications", IEEE, doi: 10.1109/Access.2020.3021033, pp. 163045-163059, 2020. (Year: 2020).*

Ekberg et al., "The Untapped Potential of Trusted Execution Environments on Mobile Devices", IEEE, doi: 10.1109/MSP.2014.38, pp. 29-37, Jul.-Aug. 2014. (Year: 2014).*

Asokan et al., "Mobile Trusted Computing", IEEE, doi: 10.1109/JPROC.2014.2332007, pp. 1189-1206, Aug. 2014. (Year: 2014).*

Isa et al., "An Approach to Establish Trusted Application", IEEE, doi: 10.1109/NETAPPS.2010.35, 2010, pp. 159-164. (Year: 2010).*

Shepherd et al., "Secure and Trusted Execution: Past, Present, and Future—A Critical Review in the Context of the Internet of Things and Cyber-Physical Systems", IEEE, doi: 10.1109/TrustCom.2016.0060, 2016, pp. 168-177. (Year: 2016).*

Chen Shuzhen et al.,"Research and implementation of data security for mobile terminal based on TEE",dated Jan. 23, 2017,total 8 pages.

Luo Jing,"Research and Implementation of Secure Payment Based on Intelligent Device's Trusted Operating System",dated Mar. 15, 2016,total 93 pages.

* cited by examiner

TRUSTED APPLICATION ACCESS CONTROL METHOD AND TERMINAL

CROSS-REFERENCE TO RELATED APPLICATIONS

This application is a U.S. National Stage of International Patent Application No. PCT/CN2017/108068 filed on Oct. 27, 2017, which claims priority to Chinese Patent Application No. 201710571054.7, filed on Jul. 13, 2017. Both of the aforementioned applications are hereby incorporated by reference in their entireties.

TECHNICAL FIELD

Embodiments of this application relate to the field of information processing technologies, and in particular, to a trusted application access control method and a terminal.

BACKGROUND

A rich execution environment (REE) and a trusted execution environment (TEE) are two operating environments that exist in parallel in a modern mobile terminal. The REE and the TEE are isolated operating environments. Application development and deployment in one environment are independent of those in the other environment.

An application in the REE is usually referred to as a client application (client application, CA), and an application in the TEE is referred to as a trusted application (TA). The TEE is a more reliable and securer environment. To access the TA, the CA needs to provide an identity credential for the TA to check whether the CA has permission to access the TA. The Global Platform (GP) develops a global platform device technology: TEE client API specification version 1.0, which is referred to as a TEE client API standard below for short.

When a terminal runs, one TA may provide access interfaces for a plurality of CAs, resulting in complexity of accessing the TA by the CA. For example, some functions implemented by using the TEE, such as fingerprint, encryption/decryption, signature/signature verification, and security time, may be provided by using the TA, provided that interfaces of the TA that meet the foregoing functions are opened to related CAs in the REE environment. However, because the REE environment is easy to be attacked, when the REE environment has been attacked, invoking the TA by the CA reduces reliability and security of the TEE, and this cannot meet a requirement for securely limiting permission for accessing the TA by the CA.

SUMMARY

Embodiments of the present invention provide a trusted application access control method and a terminal, to enhance constraint and limitation of accessing a TA by a CA, and improve security of accessing the TA by the CA.

According to a first aspect, a TA access control method is provided. The method includes: receiving, by a terminal in a TEE, a request for accessing a target TA that is sent by a CA; determining, by the terminal, a service level of the CA in the TEE based on the request for accessing the target TA; and providing, by the terminal in the TEE by using the target TA, a service corresponding to the service level for the CA. In this embodiment of this application, the target TA provides different levels of services for the CA, and determines, in the TEE, the service level corresponding to the CA, thereby enhancing constraint and limitation of accessing the target TA by the CA, and improving security of accessing the target TA by the CA.

In a first optional implementation of the first aspect, the request for accessing the target TA includes a connection method parameter, and the connection method parameter is a registered application program.

In a second optional implementation of the first aspect, where before the receiving a request for accessing a target TA that is sent by a CA, the method further includes: receiving, by the terminal in the TEE, an access rule sent by a server, where the access rule includes a correspondence between a CA identifier and a service level. In this embodiment of this application, the CA needs to be registered in a server, so that the server determines a correspondence between an access rule and a CA identifier, thereby effectively enhancing constraint and limitation of accessing the target TA by the CA.

In a third optional implementation of the first aspect, the determining, by the terminal, a service level of the CA in the TEE based on the request for accessing the target TA includes: determining, by the terminal, the CA identifier in the TEE based on the request for accessing the target TA; and determining, by the terminal in the TEE, the service level of the CA based on the correspondence between a CA identifier and a service level. In this embodiment of the present invention, it may be determined, based on the request for accessing the target TA, whether the CA requesting to access the target TA is a registered application program, and whether the method in this embodiment of this application needs to be used to perform verification, so as to more properly limit the CA to access the TA.

In a fourth optional implementation of the first aspect, the request for accessing the target TA includes a connection data parameter, and the determining the CA identifier based on the request for accessing the target TA includes any one of the following: obtaining, by the terminal in the TEE, the CA identifier in process data space of the CA, where the process data space is process data space in which a CA process is started, and the CA is read after a user identity is authenticated, and the connection data parameter includes a process data space address; obtaining, by the terminal in the TEE, the CA identifier included in the connection data parameter, where the connection data parameter includes the CA identifier; or obtaining, by the terminal, the CA identifier in the TEE based on a packet name of the CA, where the connection data parameter includes the packet name of the CA. In this embodiment of this application, the CA identifier may be obtained in a more secure and trusted manner.

In a fifth optional implementation of the first aspect, the determining a service level of the CA includes: determining, by the terminal in the TEE, a security status of a current REE corresponding to the request for accessing the target TA and a security status of the CA; and determining, by the terminal in the TEE, the service level of the CA based on the security status of the current REE and the security status of the CA. In this embodiment of this application, the service level of the CA may be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

In a sixth optional implementation of the first aspect, the security status includes "secure" or "insecure". In this embodiment of this application, a maximum of four service levels may be determined, so that a relatively insecure CA is more effectively determined, so as to more properly limit the CA to access the TA. This improves system security.

In a seventh optional implementation of the first aspect, the providing, by the terminal in the TEE by using the target TA, a service corresponding to the service level for the CA specifically includes: loading, by the terminal in the TEE, the target TA corresponding to the service level of the CA, creating a session handle of the target TA, and returning the session handle to the CA, so that the CA accesses the target TA by using the session handle of the target TA. In this embodiment of this application, different TAs may be loaded based on different service levels, so as to provide different levels of services, so that accessing the TA by the CA is limited more properly, and the CA can access the TA more securely.

In an eighth optional implementation of the first aspect, the loading, by the terminal in the TEE, the target TA corresponding to the service level of the CA includes: loading, by the terminal in the TEE, the target TA based on a loading state of the target TA and the service level of the CA. In this embodiment of this application, for a loaded TA of a service level same as that of the CA, the TA may not need to be reloaded, thereby saving data processing time and improving work efficiency.

In this embodiment of this application, the TA may provide different levels of services for the CA, and determine, in the TEE, a service level corresponding to the CA, thereby enhancing constraint and limitation of accessing the TA by the CA. Further, the service level of the CA may also be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

According to a second aspect, a TA access control method is provided. The method includes: receiving, in a TEE, a request for accessing a target TA that is sent by a CA; determining a service level of the CA in the TEE based on the request for accessing the target TA; and providing, in the TEE by using the target TA, a service corresponding to the service level for the CA.

In a first optional implementation of the second aspect, the request for accessing the target TA includes a connection method parameter, and the connection method parameter is a registered application program.

In a second optional implementation of the second aspect, before the receiving, in the TEE, a request for accessing a target TA that is sent by a CA, the method further includes: receiving, in the TEE, an access rule sent by a server, where the access rule includes a correspondence between a CA identifier and a service level.

In a third optional implementation of the second aspect, the determining a service level of the CA in the TEE based on the request for accessing the target TA includes: determining the CA identifier in the TEE based on the request for accessing the target TA; and determining the service level of the CA in the TEE based on the correspondence between a CA identifier and a service level.

In a fourth optional implementation of the second aspect, the request for accessing the target TA includes a connection data parameter, and the determining, in the TEE, the CA identifier based on the request for accessing the target TA includes any one of the following: obtaining, in the TEE, the CA identifier in process data space of the CA, where the process data space is process data space in which a CA process is started, and the CA is read after a user identity is authenticated, and the connection data parameter includes a process data space address; obtaining, in the TEE, the CA identifier included in the connection data parameter, where the connection data parameter includes the CA identifier; or obtaining the CA identifier in the TEE based on a packet name of the CA, where the connection data parameter includes the packet name of the CA.

In a fifth optional implementation of the second aspect, the determining a service level of the CA includes: determining, in the TEE, a security status of a current REE corresponding to the request for accessing the target TA and a security status of the CA; and determining, in the TEE, the service level of the CA based on the security status of the current REE and the security status of the CA.

In a sixth optional implementation of the second aspect, the security status includes "secure" or "insecure".

In a seventh optional implementation of the second aspect, the providing, in the TEE by using the target TA, a service corresponding to the service level for the CA includes: loading, in the TEE, the target TA corresponding to the service level of the CA, creating a session handle of the target TA, and returning the session handle to the CA, so that the CA accesses the target TA by using the session handle of the target TA.

In an eighth optional implementation of the second aspect, the loading, in the TEE, a target TA corresponding to the service level of the CA includes: loading, in the TEE, the target TA based on a loading state of the target TA and the service level of the CA.

According to a third aspect, a terminal is provided. The terminal includes: a receiving unit, configured to receive, in a trusted execution environment TEE, a request for accessing a target TA that is sent by a CA; a determining unit, configured to determine a service level of the CA in the TEE based on the request for accessing the target TA; and a providing unit, configured to provide, in the TEE by using the target TA, a service corresponding to the service level for the CA.

In this embodiment of this application, the target TA may provide different levels of services for the CA, and determine, in the TEE, a service level corresponding to the CA, thereby enhancing constraint and limitation of accessing the target TA by the CA. Further, the service level of the CA may also be determined with reference to the security status of the CA and the security status of the current REE, thereby effectively enhancing constraint and limitation of accessing the target TA by the CA, reducing impact of attacking the target TA by using the CA when the REE is attacked, and improving security of accessing the target TA by the CA.

In a first optional implementation of the third aspect, the request for accessing the target TA includes a connection method parameter, and the connection method parameter is a registered application program.

In a second optional implementation of the third aspect, the receiving unit is further configured to receive, in the TEE, an access rule sent by a server, where the access rule includes a correspondence between a CA identifier and a service level.

In a third optional implementation of the third aspect, the determining unit is specifically configured to determine the CA identifier based on the request for accessing the target TA; and determine the service level of the CA based on the correspondence between a CA identifier and a service level.

In a fourth optional implementation of the third aspect, the request for accessing the target TA includes a connection data parameter. The determining unit is specifically configured to: obtain, in the TEE, the CA identifier in process data space of the CA, where the process data space is process data space in which a CA process is started, and the CA is read after a user identity is authenticated, and the connection data parameter includes a process data space address; obtain, in the TEE, the CA identifier included in the connection data parameter, where the connection data parameter includes the CA identifier; or obtain the CA identifier in the TEE based on a packet name of the CA, where the connection data parameter includes the packet name of the CA.

In a fifth optional implementation of the third aspect, the determining unit is specifically configured to: determine, in the TEE, a security status of a current REE corresponding to the request for accessing the target TA and a security status of the CA; and determine the service level of the CA based on the security status of the REE and the security status of the CA.

In a sixth optional implementation of the third aspect, the security status includes "secure" or "insecure".

In a seventh optional implementation of the third aspect, the providing unit is specifically configured to: load, in the TEE, the target TA corresponding to the service level of the CA, create a session handle of the target TA, and return the session handle to the CA, so that the CA accesses the target TA by using the session handle of the target TA.

In an eighth optional implementation of the third aspect, the providing unit is specifically configured to load, in the TEE, the target TA based on a loading state of the target TA and the service level of the CA.

In this embodiment of this application, the TA may provide different levels of services for the CA, and determine, in the TEE, a service level corresponding to the CA, thereby enhancing constraint and limitation of accessing the TA by the CA. Further, the service level of the CA may also be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

According to a fourth aspect, a terminal is provided. The terminal has a function of implementing a behavior of the terminal in the first aspect or the optional implementations of the first aspect. The function may be implemented by using hardware, or may be implemented by hardware executing corresponding software. The hardware or the software includes one or more modules corresponding to the function. In this embodiment of this application, constraint and limitation of accessing the TA by the CA may be enhanced, and security of accessing the TA by the CA is improved.

According to a fifth aspect, a computer readable storage medium is provided, the computer readable storage medium stores a computer program, and the computer program implements the method in the first aspect or the second aspect when being executed by a processor.

According to a sixth aspect, a computer program product including an instruction is provided. When the instruction runs on a computer, the computer performs the method in the first aspect or the second aspect.

According to a seventh aspect, a chip is provided. The chip includes a processor and a memory; the memory is configured to store a program; the processor is configured to execute the program stored in the memory, so as to execute the method in the first aspect or the second aspect.

In this embodiment of this application, the TA may provide different levels of services for the CA, and determine, in the TEE, a service level corresponding to the CA, thereby enhancing constraint and limitation of accessing the TA by the CA. Further, the service level of the CA may also be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

DESCRIPTION OF EMBODIMENTS

The technical solutions of this application are further described in detail with reference to accompanying drawings and embodiments as follows.

Figure 1:
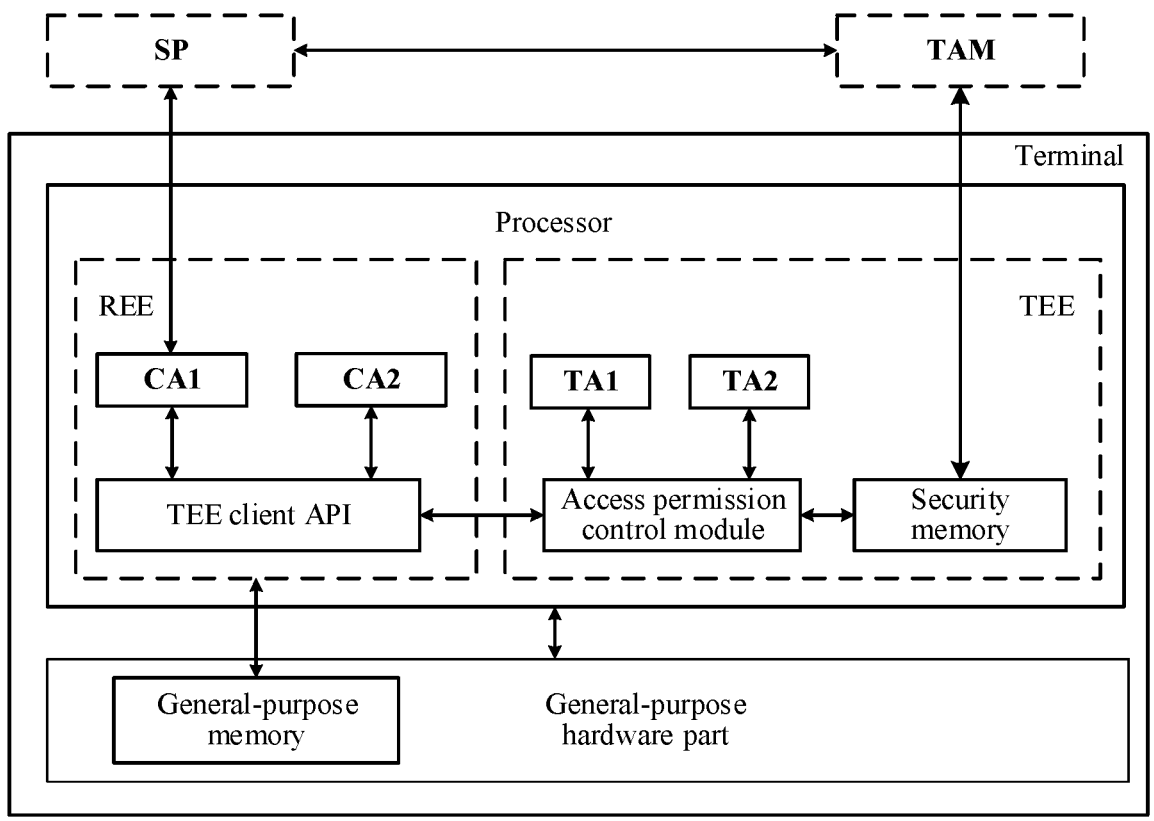
FIG. 1 is a schematic structural diagram of a system according to an embodiment of this application.

FIG. 1 is a schematic structural diagram of a system according to an embodiment of this application. As shown in FIG. 1, the system includes a server and a terminal, and the server includes a service provider (SP) server and a trusted service management server (trusted application manager, TAM).

The terminal may include a processor and a general-purpose hardware part. The processor may implement at least two execution environments: a TEE and an REE. The TEE and the REE may be two states of the processor of the terminal, and the processor may be switched between the two states to run. The TEE and the REE may run in parallel on a same processing circuit, or the TEE and the REE may separately run on independent processing circuits. The processing circuit may include a processor, and may further include another hardware such as a memory.

The TEE of the terminal may further include a security memory. The security memory may store an access rule. For example, the security memory may store an access rule from the TAM, or may also store a predefined access rule. The security memory may further store a TA interface control method. For example, the security memory may store a TA interface control method from the TAM, or may also store a predefined TA interface control method. The TEE can access the general-purpose hardware part and the security memory, and the REE can only access the general-purpose hardware part. For example, when the terminal is configured with the TEE when delivered from a factory, the predefined access rule or the TA interface control method may be stored in the security memory, and after being delivered from a factory, the TEE may be updated according to the access rule or the TA interface control method sent by the TAM.

The general-purpose hardware part may include a general-purpose memory, and the general-purpose memory may also store the access rule or the TA interface control method. The security memory may be a logically independent region of the general-purpose memory, or may be a memory independent of the general-purpose memory.

A structure and a function of the general-purpose hardware part are described in detail with reference to FIG. 2 in subsequent content. Details are not described herein.

An application program in the REE is usually referred to as a CA, and an application program in the TEE is referred to as a TA. The REE may include at least one CA, the TEE may include at least one TA, each TA may include at least one interface, and different interfaces of a same TA may provide different levels or different types of services.

The REE of the terminal may include a CA and a TEE client interface, and the CA may access the TEE by using the TEE client interface. In a process of interaction between the REE of the terminal and the TEE of the terminal, the REE of the terminal may also be referred to as a client, and correspondingly, the TEE of the terminal may also be referred to as a server.

The TEE of the terminal may include an access permission control module. The access permission control module is configured to control access of the TA. For example, the access permission control module is configured to control access of the TA according to a TA interface control method stored in the security memory or the general-purpose memory. In the TA interface control method, controlling access of the TA may include a correspondence between a TEE client interface and an access rule, and the correspondence between a TEE client interface and an access rule may instruct the CA to perform, when accessing the TA by using the TEE client interface, TA access control according to an access rule corresponding to the TEE client interface. Further, the access permission control module may be configured to: determine an access permission of the CA according to the access rule stored in the security memory or the general-purpose memory, or determine a service level of the CA, or determine the access permission of the CA, and further determine the service level of the CA.

In an example, the access permission control module may determine the service level of the CA according to the access rule. For example, when the terminal stores a correspondence table between a CA identifier and a service level shown in Table 1, the access permission control module may obtain, through query, the service level of the CA by using the CA identifier. For another example, when the terminal stores a correspondence table between a CA identifier and a service level shown in Table 2, the access permission control module may obtain, through query by using the CA identifier, a service level of a CA corresponding to the TA interface that the CA accesses.

TABLE 1

| CA identifier | Service level |
| --- | --- |
| CA1 | Level 1 |
| CA2 | Level 2 |
| ... | ... |

TABLE 2

| CA identifier | Service level |
| --- | --- |
| CA1 | TA1 interface 1, level 1 |
| CA1 | TA1 interface 3, level 3 |
| CA1 | TA2 interface 2, level 1 |
| CA1 | TA2 interface 3, level 3 |
| CA2 | TA1 interface 1, level 2 |
| CA2 | TA2 interface 1, level 2 |
| ... | ... |

In another example, with reference to Table 3, the access permission control module is configured to: determine a security status of the REE of the terminal, a security status of the CA, or a security status of the CA and a security status of the REE of the terminal, and determine the service level of the CA based on the security status of the REE of the terminal, the security status of the CA, or the security status of the CA and the security status of the REE of the terminal.

TABLE 3

| Security status of a CA | Security status of an REE of a terminal | Service level |
| --- | --- | --- |
| Security | Security | Level 1 |
| Insecurity | Security | Level 2 |
| Security | Insecurity | Level 3 |
| Insecurity | Insecurity | No right to access |

It should be noted that the security status and the service level in Table 3 are merely examples. In this embodiment of this application, more or fewer security statuses and more or fewer service levels may be included.

In another example, with reference to Table 4, the access permission control module may determine permission of the CA according to the access rule. With reference to Table 3, the service level of the CA is determined based on the security status of the REE of the terminal, the security status of the CA, or the security status of the CA and the security status of the REE of the terminal. The access permission control module may be a function provided in a TEE operating system, or may also be a common TA, where the common TA may be a TA that may provide an access interface for a plurality of CAs.

TABLE 4

| CA identifier | TA interface |
| --- | --- |
| CA1 | TA1 interface 1 |
| CA1 | TA1 interface 3 |
| CA1 | TA2 interface 2 |
| CA1 | TA2 interface 3 |
| CA2 | TA1 interface 1 |
| CA2 | TA2 interface 1 |
| ... | ... |

An SP server is mainly configured to publish the CA. After developing the CA, the SP may submit the CA identifier and a list of TA interfaces that the CA applies for accessing to the TAM, so as to implement registration in the TAM.

The TAM may generate an access rule based on the CA identifier and the TA interface that the CA applies for accessing, and send the access rule to the terminal. For example, the access rule may be a whitelist. As shown in Table 5, the whitelist may include a correspondence between a CA identifier and a TA that the CA has permission to access. Alternatively, as shown in Table 6, the whitelist may further include a correspondence between a CA identifier and a service level. The TAM may send the access rule to the TEE of the terminal by using an air interface.

TABLE 5

| CA identifier | TA interface |
|---|---|
| CA1 | TA1 interface 1 |
| CA1 | TA1 interface 3 |
| CA1 | TA2 interface 2 |
| CA1 | TA2 interface 3 |
| ... | ... |

TABLE 6

| CA identifier | Service level |
|---|---|
| CA1 | TA1 interface 1, level 1 |
| CA1 | TA1 interface 3, level 3 |
| CA1 | TA2 interface 2, level 1 |
| CA1 | TA2 interface 3, level 3 |
| ... | ... |

It should be noted that Table 1 or Table 2 shows only an access rule of the CA1 that is generated by the TAM when the CA1 is registered in the TAM, and the SP server may further register a plurality of CAs in the TAM. In this case, the TAM may generate an access rule of the plurality of CAs. In addition, when sending the access rule to the terminal, the TAM may send only an access rule related to the terminal. For example, if the terminal includes the TA2 and does not include the TA1, the TAM may not send an access rule related to the TA1 to the terminal, but sends only a rule related to the TA2 to the terminal.

The TAM may further generate a TA interface control method, and send the TA interface control method to the TEE of the terminal.

The following further describes the interaction between the REE of the terminal and the TEE of the terminal in this embodiment of this application.

When the CA in the REE of the terminal accesses the TA in the TEE, the CA usually needs to invoke an open session interface (TEEC_OpenSession) to request to access the TA, so that the terminal loads a specified TA in the TEE, and the specified TA provides a service for the CA. The TEEC_OpenSession may include at least two parameters such as a connection method parameter and a connection data parameter. The connection method parameter may indicate a method for establishing a connection between the TA and the CA, and the connection data parameter may include data required for the CA to access the TA. The TEE of the terminal may select a control method based on the connection method parameter to control the CA to access the TA. For example, the connection method parameter may include a registration application program, and a corresponding value may be 0x00000007.

When the TEE of the terminal determines that the connection method parameter is TEEC_LOGIN_Registered_APPLICATION, the TEE of the terminal may determine a service level corresponding to the CA. For example, the TEE of the terminal may verify whether the CA has been registered in the TAM, for example, verify whether the CA is in the whitelist. When the CA has been registered in the TAM, the TEE of the terminal may determine that the CA has permission to access the TA. When the CA has permission to access the TA, the TEE of the terminal may further determine the service level of the CA. For another example, the TEE of the terminal may determine the security status of the REE or the security status of the CA, or the security status of the CA and the security status of the REE, and determine the service level of the CA based on the security status of the REE or the security status of the CA, or the security status of the CA and the security status of the REE.

In this embodiment of this application, the connection method parameter that is used when the CA accesses the common TA may be required to be TEEC_LOGIN_Registered_APPLICATION, or it is considered that the CA does not have permission to access the common TA.

Further, when the CA requests to access the TA, the CA provides the CA identifier to the TEE of the terminal, and the TEE of the terminal performs verification based on the CA identifier and the access rule. After the verification succeeds, a TA instance that provides a service for the CA is loaded in the TEE.

For example, the CA provides the CA identifier to the access permission control module of the TEE to prove an identity of the CA. The CA identifier can uniquely identify an application program, and the application program may be the CA or an application program corresponding to the CA. For example, when the CA is an application program, the CA identifier may uniquely identify the application program; or when the CA is a process, the CA identifier may uniquely identify an application program corresponding to the process.

When the CA is an application program, the CA identifier may include a certificate of the application program (for example, an APK (android package, Android installation package) certificate), and the CA identifier may further include an application program signature (for example, an APK signature). When the CA is a process, the CA identifier may be an application program identifier corresponding to the process. For example, the CA identifier may include a certificate of a process identity (for example, the CA identifier may be a certificate of an application program corresponding to the process), and the CA identifier may further include a signature of the application program corresponding to the process.

In addition, the CA may provide the CA identifier in a plurality of manners. For example, a connection data parameter of the open session interface invoked by the CA may include the CA identifier. Alternatively, the connection data parameter of the open session interface invoked by the CA may include a packet name of the CA, and the TEE of the terminal obtains the CA identifier based on the packet name of the CA. For example, the TEE of the terminal may request the CA identifier for a packet management module (Package Manager) in the REE by using the packet name of the CA. Alternatively, the connection data parameter of the open session interface invoked by the CA may include a pointer, where the pointer points to process data space. The TEE of the terminal may obtain the CA identifier in the process data space based on the pointer, where the process data space is process data space in which a CA process is started, and the CA is read after a user identity is authenticated.

Further, the CA may provide the CA identifier in a corresponding manner with reference to a type of the CA.

In an example, when the CA is an application program, when the CA requests to access the TA, a connection data parameter sent by the CA to the TEE of the terminal may include the CA identifier. In one embodiment, when the CA requests to access the TA, the connection data parameter sent by the CA to the TEE of the terminal may include the packet name of the CA.

In another example, when the CA is a process, when the CA requests to access the TA, the CA may store a CA identifier in data space of the process, and the connection data parameter sent by the CA to the TEE of the terminal may include a location of the CA identifier in the data space of the process. In one embodiment, when the CA requests to access the TA, the connection data parameter sent by the CA to the TEE of the terminal may include the CA identifier.

In addition, each time establishing a session between the CA and the TA, the access permission control module may determine the service level of the CA, determine, based on the service level of the CA, an interface that the TA opens to the CA, and determine a range of data returned to the CA. With reference to Table 1, Table 2, Table 3, and Table 7, videos with different resolutions or audios with different quality may be returned to different CAs based on a service level of a CA. For another example, for a Web interface of the TEE, different browsers may be granted different permissions based on a service level of a browser (CA).

The RF circuit 220 may be configured to receive and send a signal in an information receiving or sending process or a call process. In particular, after receiving downlink information of a base station, the RF circuit 220 sends the downlink information to the processor 280 for processing, and in addition, sends related uplink data to the base station. The RF circuit usually includes but is not limited to an antenna, at least one amplifier, a transceiver, a coupler, a low noise amplifier (LNA), a duplexer, and the like. In addition, the RF circuit 220 may further communicate with a network and another device through wireless communication. The wireless communication may use any communications standard or protocol, including but not limited to global system for mobile communications (GSM), general packet radio service (general packet radio service, GPRS), a code division multiple access (CDMA) system, a wideband code division multiple access (WCDMA) system, a long term evolution (LTE) system, an email, a short message service (SMS), and the like.

TABLE 7

| Service level | Video service | Payment service | Encryption/ Decryption service | Signature service | Fingerprint service | Security time |
|---|---|---|---|---|---|---|
| Level 3 | 480P video | Prohibited | Encryption prohibited and decryption prohibited | Signature prohibited and signature verification prohibited | Prohibited | Short |
| Level 2 | 720P video | Allowed | Decryption prohibited and encryption allowed | Signature verification allowed and signature allowed | Prohibited | Moderate |
| Level 1 | 1080P video | Allowed | Encryption allowed and decryption allowed | Signature allowed and signature verification allowed | Allowed | Long |
| . . . | . . . | . . . | . . . | . . . | . . . | . . . |

The terminal may be user equipment (UE), for example, a mobile phone, a cellular phone, a cordless phone, a session initiation protocol (SIP) phone, a wireless local loop (WLL) station, a tablet computer, a personal digital assistant (PDA), a handheld device with a wireless communication function, a computing device, an in-vehicle communications module, an M2M device, a smartwatch, a mobile station (MS), a mobile terminal, a computer, and a microcomputer. This is not limited in this application.

For example, the mobile terminal is a mobile phone. FIG. 2 is a block diagram of a partial structure of a mobile phone 200 related to an embodiment of the present invention. Referring to FIG. 2, the mobile phone 200 includes components such as a radio frequency (RF) circuit 210, a memory 220, an input unit 230, a display screen 240, a sensor 250, an audio circuit 260, a WiFi wireless fidelity) module 270, a processor 280, and a power supply 290. A person skilled in the art may understand that a structure of the mobile phone shown in FIG. 2 does not constitute a limitation on the mobile phone, and the mobile phone may include more or fewer components than those shown in the figure, may combine some components, or may have different component arrangements.

Figure 2:
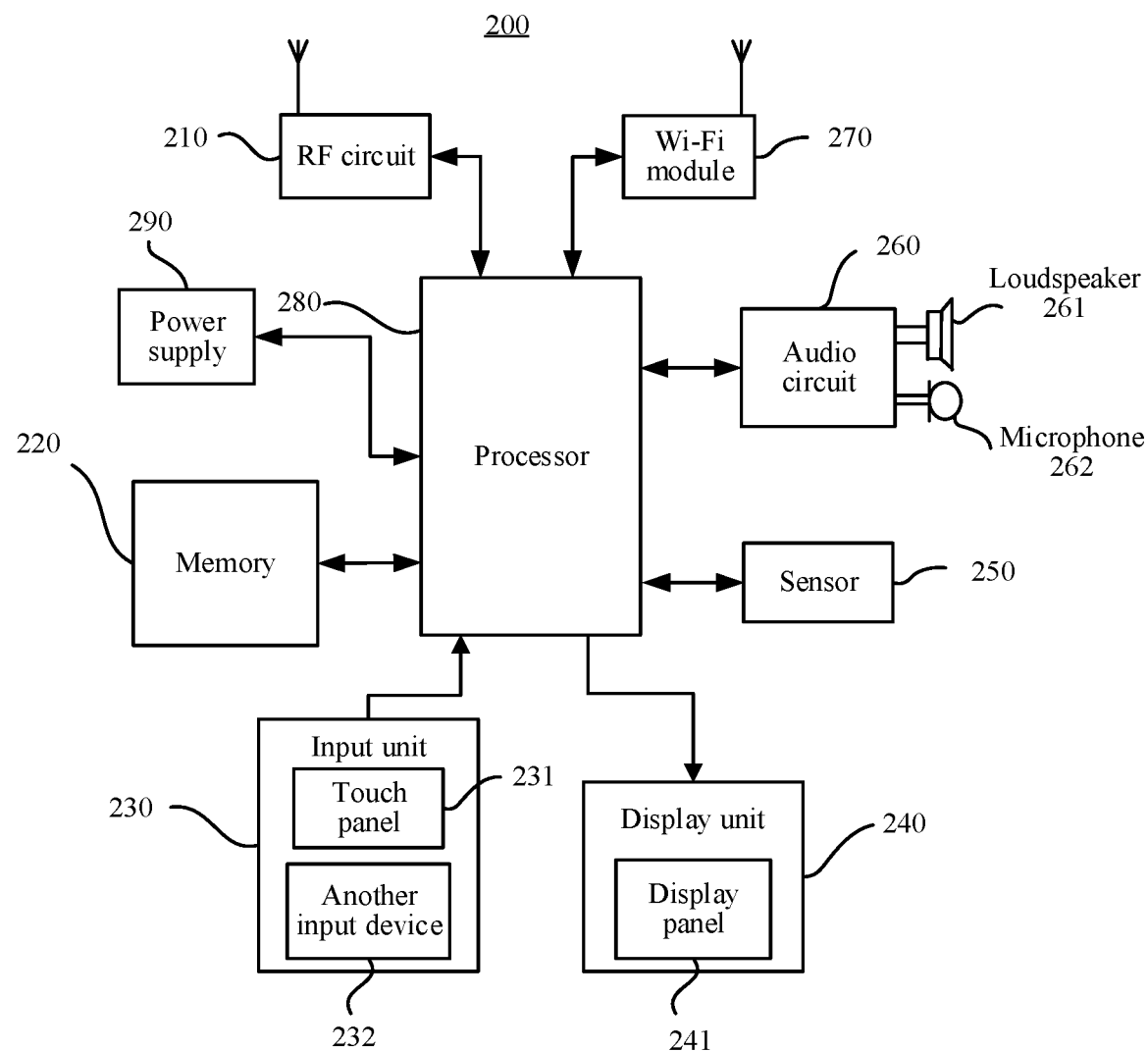
FIG. 2 is a schematic structural diagram of a mobile phone according to an embodiment of this application.

The following specifically describes the components of the mobile phone 200 with reference to FIG. 2.

The memory 220 may be configured to store a software program and a module. The processor 280 runs the software program and the module stored in the memory 220, to perform various functional applications and data processing of the mobile phone 200. The memory 220 may mainly include a program storage area and a data storage area. The program storage area may store an operating system, an application program required by at least one function (such as a sound playing function or an image playing function), and the like. The data storage area may store data (such as audio data or a phone book) created based on use of the mobile phone 200, and the like. In addition, the memory 220 may include a volatile memory such as a nonvolatile random access memory (NVRAM), a phase change random access memory (PRAM), or a magnetoresistive random access memory (MRAM); and the memory 220 may further include a nonvolatile memory such as at least one magnetic disk storage device, an electrically erasable programmable read-only memory (EEPROM), a flash memory device such as a NOR flash memoryor a NAND flash memory, a semiconductor device such as a solid state disk (SSD). Alternatively, the memory 220 may further include a combination of the foregoing types of memories.

The input unit 230 may be configured to: receive entered digital or character information and generate key signal input related to a user setting and function control of the mobile phone 200. Specifically, the input unit 230 may include a touch panel 231 and another input device 232. The touch panel 231, also referred to as a touchscreen, may collect a touch operation of the user on or near the touch panel 231 (such as an operation of the user on or near the touch panel 231 by using any suitable object or accessory such as a finger or a stylus), and drive a corresponding connection apparatus based on a preset program. In one embodiment, the touch panel 231 may include two parts: a touch detection apparatus and a touch controller. The touch detection apparatus detects a touch location of the user, detects a signal brought by a touch operation, and delivers the signal to the touch controller. The touch controller receives touch information from the touch detection apparatus, converts the touch information into touch point coordinates, and sends the touch point coordinates to the processor 280. In addition, the touch controller can receive and execute a command sent by the processor 280. In addition, the input unit 230 may implement the touch panel 231 in a plurality of types, such as a resistive type, a capacitive type, an infrared ray, and a surface acoustic wave. In addition to the touch panel 231, the input unit 230 may further include another input device 232. Specifically, the another input device 232 may include, but is not limited to, one or more of a physical keyboard, a functional button (for example, a sound volume control button or a power button), a trackball, a mouse, a joystick, and the like.

The display screen 240 may be configured to display information entered by the user, information provided for the user, and various menus of the mobile phone 200. The display screen 240 may include a display panel 241. In one embodiment, the display panel 241 may be configured by using a liquid crystal display (LCD), an organic light-emitting diode (OLED), or the like. Further, the touch panel 231 may cover the display panel 241. After detecting a touch operation on or near the touch panel 231, the touch panel 241 transfers the touch operation to the processor 280, to determine a type of a touch event. Subsequently, the processor 280 provides a corresponding visual output on the display panel 241 based on the type of the touch event. Although in FIG. 2, the touch panel 231 and the display panel 241 serve as two independent components to implement input and input functions of the mobile phone 200. However, in some embodiments, the touch panel 231 and the display panel 241 may be integrated to implement the input and output functions of the mobile phone 200. The display screen 240 may be configured to display content, where the content includes a user interface such as a startup interface of a terminal and a user interface of an application program. The content may include information and data in addition to the user interface. The display screen 240 may be a built-in screen of the terminal or another external display device.

The mobile phone 200 may further include at least one type of sensor 250, such as a light sensor, a motion sensor, a location sensor, or another sensor. Specifically, the optical sensor may include an ambient light sensor and a proximity sensor. The ambient light sensor may obtain luminance of an ambient light, and adjust luminance of the display panel 241 based on brightness of the ambient light. The proximity sensor may turn off the display panel 241 and/or backlight when the mobile phone 200 moves to an ear. The motion sensor includes an acceleration sensor, where the acceleration sensor may detect acceleration magnitudes in all directions (generally three axes). When the acceleration sensor is stationary, the acceleration sensor may detect a magnitude and a direction of gravity, and may be configured to recognize a posture application of the mobile phone (such as switching between landscape and portrait, related games, and magnetometer posture calibration), vibration recognition related functions (such as a pedometer and a knock), and the like. Other sensors such as a gyroscope, a barometer, a hygrometer, a thermometer, and an infrared sensor may be configured in the mobile phone 200. Details are not described herein.

The audio circuit 260, a loudspeaker 261, and a microphone 262 (also referred to as a microphone) may provide an audio interface between the user and the mobile phone 200. The audio circuit 260 may convert received audio data into an electrical signal, and then transmit the electrical signal to the loudspeaker 261, and the loudspeaker 261 converts the electrical signal into a sound signal for output. In addition, the microphone 262 converts a collected sound signal into an electrical signal. The audio circuit 260 receives the electrical signal, converts the electrical signal into audio data, and then outputs the audio data to the processor 280 for processing. After the processing, the processor 280 sends the audio data to, for example, another mobile phone by using the RF circuit 210, or outputs the audio data to the memory 220 for further processing.

WiFi belongs to a short-distance wireless transmission technology. The mobile phone 200 may help, by using the WiFi module 270, the user receive and send an email, browse a web page, access streaming media, and the like. The WiFi module 270 provides wireless broadband Internet access for the user. Although FIG. 2 shows the WiFi module 270, it can be understood that the WiFi module 270 is not a necessary part of the mobile phone 200 and may certainly be omitted as required provided that the essence of the present invention is not changed.

The processor 280 is a control center of the mobile phone 200, uses various interfaces and lines to connect all parts of the entire mobile phone, and executes various functions and processes data of the mobile phone 200 by running or executing software programs and/or modules stored in the memory 220 and invoking data stored in the memory 220, to perform overall monitoring on the mobile phone. The processor 280 may be a central processing unit (central processing unit, CPU), a general-purpose processor, a digital signal processor (DSP), an application specific integrated circuit (ASIC), a field programmable gate array (FPGA), or another programmable logical device, a transistor logical device, a hardware component, or a combination thereof. The processor 280 may implement or execute various example logical blocks, modules, and circuits described with reference to content disclosed in this application. Alternatively, the processor 280 may be a combination of processors implementing a computing function, for example, a combination of one or more microprocessors, or a combination of the DSP and a microprocessor. In one embodiment, the processor 280 may include one or more processor units. In one embodiment, an application processor and a modem processor may be integrated into the processor 280, the application processor mainly processes an operating system, a user interface, an application program, and the like, and the modem processor mainly processes wireless communication. It may be understood that, alternatively, the modem processor may not be integrated into the processor 280.

The mobile phone 200 further includes the power supply 290 (such as a battery) that supplies power to each component. Preferably, the power supply may be logically connected to the processor 280 by using a power management system, to implement functions such as charging management, discharging management, and power consumption management by using the power management system.

It should be noted that although not shown, the mobile phone 200 may further include a camera, a Bluetooth module, and the like. Details are not described herein.

The following further describes the embodiments of this application with reference to the accompanying drawings.

Figure 3:
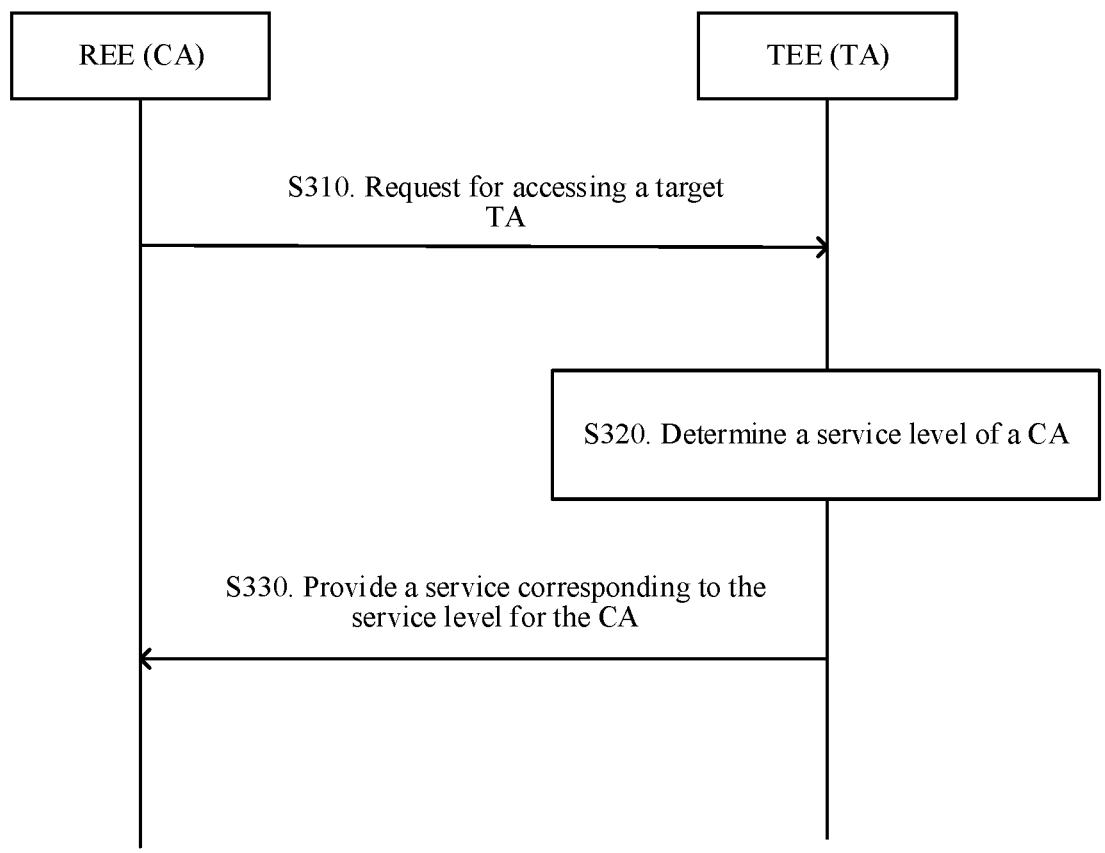
FIG. 3 is a schematic diagram of signaling interaction of a TA access control method according to an embodiment of this application.

FIG. 3 is a schematic diagram of signaling interaction in a TA access control method according to an embodiment of this application. As shown in FIG. 3, the method specifically includes the following operations.

S310. A terminal receives, in a TEE, a request for accessing a target TA that is sent by a CA.

When the CA needs to access the target TA, the CA invokes an open session interface to send the request for accessing the target TA to an access permission control module. The request for accessing the target TA may include a connection method parameter. The connection method parameter is used to indicate a method used when the TA establishes a connection to the CA. For example, the connection method parameter may be a registered application program TEEC_LOGIN_Registered_APPLICATION, and a corresponding value may be 0x00000007.

S320. The terminal determines a service level of the CA in the TEE.

The access permission control module may determine, based on an identifier of the CA requesting to access the target TA, whether the CA has permission to access the target TA, and if the CA has permission to access the target TA, the access permission control module may further determine the service level corresponding to the CA.

In an example, the TEE of the terminal may include a whitelist. The whitelist may include a correspondence between a CA identifier and a TA interface that is shown in Table 4, and may further include a correspondence between a CA identifier and a service level provided by a TA that is shown in Table 1 or Table 2. The whitelist may be obtained from a TAM, or may be predefined. For example, when updating of a CA by the TAM relates to the whitelist, or when a CA is registered with the TAM, the TAM may generate a correspondence between a CA identifier and a TA interface, and a correspondence between a CA identifier and a service level provided by a TA, and send the correspondences to the terminal, so that the terminal establishes or updates the whitelist in the TEE. For another example, when the TEE is configured at delivery of the terminal, a predefined access rule may be stored in the TEE of the terminal, and after delivery, the TEE may be further updated according to an access rule sent by the TAM.

After receiving the request for accessing the target TA, the TEE of the terminal may match the CA identifier of the CA that initiates the request with the whitelist. If an entry corresponding to the CA identifier exists in the whitelist, and a corresponding target TA interface exists in the entry, it indicates that the CA has permission to access the target TA; or if the entry corresponding to the CA identifier does not exist, or the corresponding target TA interface does not exist in the entry corresponding to the CA identifier, it indicates that the CA has no permission to access the target TA. In one embodiment, when the CA identifier of the CA that initiates the request is matched with the whitelist, if the entry corresponding to the CA identifier exists in the whitelist, and a corresponding service level provided by the target TA exists in the entry, it indicates that the CA has permission to access the target TA, and the target TA may provide a service corresponding to the service level in the entry for the CA; or if the entry corresponding to the CA identifier does not exist, or the corresponding service level provided by the target TA does not exist in the entry corresponding to the CA identifier, it indicates that the CA has no permission to access the target TA.

The TEE of the terminal may obtain the CA identifier in a plurality of manners.

For example, the request for accessing the target TA may include connection data, the connection data may include the CA identifier, and the TEE of the terminal may obtain the CA identifier.

In one embodiment, the request for accessing the target TA may include connection data, and the connection data parameter includes a process data space address. The TEE of the terminal may obtain the CA identifier in process data space. The process data space is process data space in which a CA process is started, and the CA is read after a user identity is authenticated.

In one embodiment, the connection data parameter includes a packet name of the CA, and the TEE of the terminal may obtain the CA identifier based on the packet name of the CA.

In another example, the terminal may determine, in the TEE, a security status of a current REE and a security status of the CA, and determine, based on the security status of the REE and the security status of the CA, the service level corresponding to the CA.

For example, with reference to Table 3 in the foregoing embodiment, if the terminal determines, in the TEE, that the security status of the REE is "secure", the security status of the CA is "secure", and the security level corresponding to the CA is the highest, the target TA may provide a highest-level service for the CA. For example, the target TA provides a video having highest resolution for the CA. If the terminal determines, in the TEE, that either the security status of the REE or the security status of the CA is "secure", and the other is "insecure", the target TA may provide a secondary-level service for the CA. If the terminal determines, in the TEE, that neither the security status of the REE nor the security status of the CA is "secure", it may be considered that the CA has no permission to access the target TA.

In another example, the terminal may determine, in the TEE according to an access rule, whether the CA has permission to access the target TA, and when the CA has permission to access the TA, determine, based on a security status of an REE of the terminal and a security status of the CA, the service level corresponding to the CA. For a manner in which the terminal determines, in the TEE, whether the CA has permission to access the target TA, and determines the security status of the REE and the security status of the CA, refer to the foregoing example. Details are not described herein again.

S330. Provide, in the TEE by using the target TA, a service corresponding to the service level for the CA.

When it is determined, in the TEE, that the CA has no permission to access the target TA, the TA may prompt that CA session initialization fails.

When it is determined, in the TEE, that the CA has permission to access the target TA, an instance corresponding to the target TA at the service level may be loaded based on the service level corresponding to the CA, and the instance provides the service corresponding to the service level for the CA.

For example, with reference to Table 7 in the foregoing embodiment, for a target TA that has a signature function, if the service level of the CA that initiates the request is a level 3, in this case, the target TA can provide a signature verification service for the CA, but cannot provide a signature service. When the TEE of the terminal loads the instance of the target TA, the loaded instance of the target TA may not include a component that provides the signature service.

For another example, with reference to Table 7 in the foregoing embodiment, for a target TA that has a signature service and a fingerprint service, if the service level of the CA that initiates the request is a level 2, in this case, the target TA can provide the signature service and a signature verification service for the CA, but cannot provide the fingerprint service. When the TEE of the terminal loads the instance of the target TA, the loaded instance of the target TA may not include a component that provides the fingerprint service. In addition, the instance of the target TA may be further loaded based on a service requested by the CA. For example, if the CA requests only a video service, when the target TA can provide a plurality of services, the loaded instance of the target TA may include only a component that provides the video service. The service requested by the CA may be determined based on a specific interface that is provided by the target TA and that is invoked by the CA.

After the CA determines that the service ends, the CA may further send a close session (TEEC_CloseSession) request to the access permission control module or the target TA.

In this embodiment of this application, the TA provides services at different service levels for the CA. When the CA does not meet a condition, the TA may refuse to provide a service for the CA, thereby improving security of accessing the TA by the CA, and reducing impact on the TA in the TEE when the REE is attacked. Further, the TA may provide different levels of services for the CA, and the terminal determines, in the TEE, the service level corresponding to the CA, thereby enhancing constraint and limitation of accessing the TA by the CA. Further, the service level of the CA may be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

The following further describes this embodiment of this application with reference to specific examples.

Figure 4:
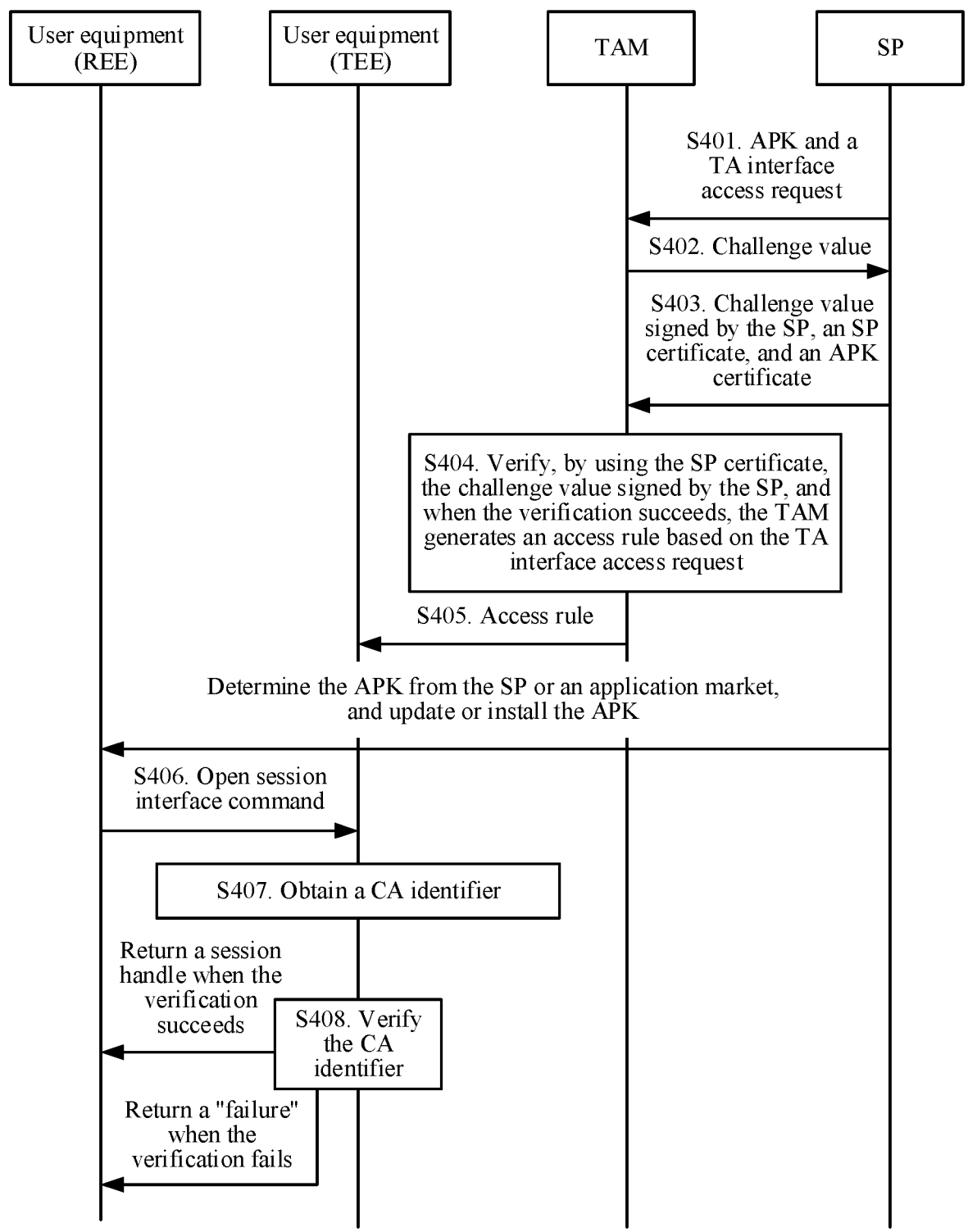
FIG. 4 is a schematic diagram of signaling interaction of another TA access control method according to an embodiment of this application.

FIG. 4 is a schematic diagram of signaling interaction of another TA access control method according to an embodiment of this application. As shown in FIG. 4, the method specifically includes the following operations.

S401. An SP sends an application installation package and a TA interface access request to a TAM.

The SP needs to install or update a CA developed by the SP on user equipment, so that the user equipment uses the CA developed or updated by the SP. Before installing or updating, the SP may send the TA interface access request to the TAM for registration at the TAM. The TA interface access request is used to request to bind the CA to the TA, or bind the CA to some functions of the TA. In other words, the TA interface access request is used to request to access all or some of the interfaces of the TA. It should be noted that there may be one or more CAs developed by the SP. In the one or more CAs, there may be some interfaces that request to access the TA, and there may be some interfaces that do not need to access the TA.

The TAM may further review the CA, for example, check whether code of the CA is proper, and whether there is hidden malicious code.

S402. The TAM sends a challenge value to the SP. The challenge value may be a random number.

S403. The SP signs the challenge value by using a private key, and sends an SP certificate and an APK certificate to the TAM. The APK certificate may be an APK certificate signed by the SP or a certificate issued by an authority certificate issuing authority. The APK certificate and a name of the CA may be used to identify the CA.

S404. The TAM verifies, by using the SP certificate, the challenge value signed by the SP. When the verification succeeds, the TAM generates an access rule based on the TA interface access request, where the access rule includes the name of the CA and a correspondence between an APK certificate (CA identifier) and a service level. For example, the access rule may indicate a command set, video quality, or the like supported by a TA that allows the CA to access.

S405. The TAM sends the access rule to the access permission control module.

For example, the TAM may update a whitelist of an access permission control module in a TEE of a terminal managed by the TAM.

S406. When the CA accesses the TA or accesses the TA by using an REE operating system service, the CA invokes an open session interface command. A connection method parameter included in the open session interface command may be TEEC_LOGIN_Registered_APPLICATION. The open session interface command may further instruct the access permission control module in the TEE of the terminal to obtain the CA identifier from the connection data parameter. For example, the CA identifier may be a self-signed certificate of the CA and the name of the CA.

S407. The access permission control module obtains the CA identifier by using the connection data parameter.

S408. The access permission control module verifies the CA identifier based on the whitelist, and when the verification succeeds, returns a session handle.

In addition, the terminal sets, in the TEE, a command filter on the session based on a service level corresponding to the CA. In one embodiment, the terminal determines, in the TEE, a loading manner of the TA based on the service level corresponding to the CA. For example, the access permission control module may specify different loading parameters for the TA, so as to load, in the TEE of the terminal, TA instances corresponding to different service levels. The TA instances corresponding to different service levels provide different levels of services.

When the access permission control module verifies the CA identifier based on the whitelist, if the verification fails, the TA prompts that the CA session initialization fails, or the TA prompts that the CA has no permission to access the TA.

In addition, after the verification performed by the access permission control module on the CA succeeds, when the CA sends an instruction to the TA directly or by using the REE operating system service, the TA may check, by using the command filter, whether the received instruction is valid. If the instruction is valid, the TA executes and returns the session handle based on the instruction; or if the instruction is invalid, the TA prompts that the CA does not have the permission.

In another embodiment, when the CA first invokes the TA, the TA provides a user ID or a PIN code set by a user, or the user ID and the PIN code set by the user, so that when the CA invokes the TA again, the access permission control module may check the user ID or the PIN code set by the user, or the user ID and the PIN code set by the user.

In this embodiment of this application, the TA may provide different levels of services for the CA, and determine, in the TEE, a service level corresponding to the CA, thereby enhancing constraint and limitation of accessing the TA by the CA.

Figure 5:
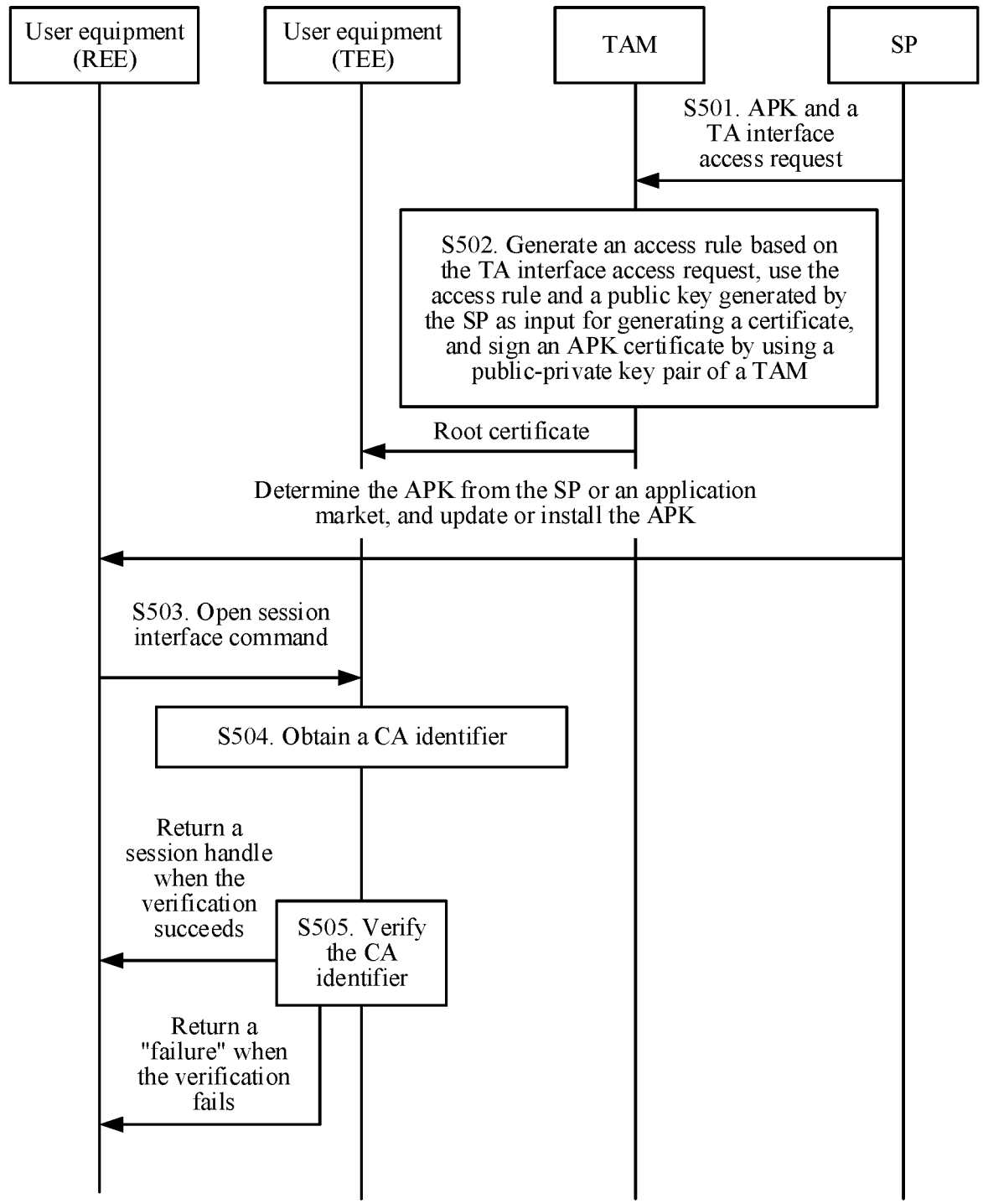
FIG. 5 is a schematic diagram of signaling interaction of another TA access control method according to an embodiment of this application.

FIG. 5 is a schematic diagram of signaling interaction of another TA access control method according to an embodiment of this application. As shown in FIG. 5, the method specifically includes the following operations.

S501. An SP sends an application installation package and a TA interface access request to a TAM.

The SP needs to install or update a CA developed by the SP on user equipment, so that the user equipment uses the CA developed or updated by the SP. Before installing or updating, the SP may send a TA interface access request to the TAM for registration at the TAM. The TA interface access request is used to request to bind the CA to the TA, or bind the CA to some functions of the TA. In other words, the TA interface access request is used to request to access all or some of the interfaces of the TA.

The TA interface access request may include an SP certificate and an APK, and may further include a public key in a public-private key pair generated by the SP for the CA and a signature of the APK (an APK signature value) obtained by using a private key.

S502. The TAM generates an access rule based on the TA interface access request, uses the access rule and the public key generated by the SP as input for generating a certificate, and uses the public-private key pair of the TAM to issue an APK certificate (the TAM serves as an authoritative certificate issuing authority).

The TAM may preconfigure, in the installation package of the TA, or a vendor configures, in a TEE operating system, a root certificate of the APK certificate that can be used to verify the CA.

S503. When the CA accesses the TA or accesses the TA by using an REE operating system service, the CA invokes an open session interface command. For example, a connection method parameter included in the open session interface command is TEEC_LOGIN_Registered_APPLICATION. The open session interface command may further instruct the access permission control module to obtain the CA identifier from the connection data parameter, where the CA identifier includes the APK certificate of the CA and a name of the CA.

S504. The access permission control module obtains the APK certificate and the name of the CA from the connection data parameter.

S505. The access permission control module verifies the APK certificate based on the root certificate, and when the verification succeeds, the TEE of the terminal returns a session handle to the CA.

In addition, the terminal sets, in the TEE, a command filter on the session based on a service level corresponding to the CA. In one embodiment, the terminal determines, in the TEE, a loading manner of the TA based on the service level corresponding to the CA. For example, the access permission control module may specify different loading parameters for the TA, so as to load, in the TEE of the terminal, TA instances corresponding to different service levels. The TA instances corresponding to different service levels provide different levels of services.

When the access permission control module verifies the CA identifier based on the whitelist, if the verification fails, the TA prompts that the CA session initialization fails, or the TA prompts that the CA has no permission to access the TA.

In addition, after the verification performed by the access permission control module on the CA succeeds, when the CA sends an instruction to the TA directly or by using the REE operating system service, the TA may check, by using the command filter, whether the received instruction is valid. If the instruction is valid, the TA executes and returns the session handle based on the instruction; or if the instruction is invalid, the TA prompts that the CA does not have the permission.

In another embodiment, when the CA first invokes the TA, the TA provides a user ID or a PIN code set by a user, or the user ID and the PIN code set by the user, so that when the CA invokes the TA again, the access permission control module may check the user ID or the PIN code set by the user, or the user ID and the PIN code set by the user.

In this embodiment of this application, the TA may provide different levels of services for the CA, and determine, in the TEE, a service level corresponding to the CA, thereby enhancing constraint and limitation of accessing the TA by the CA.

Figure 6:
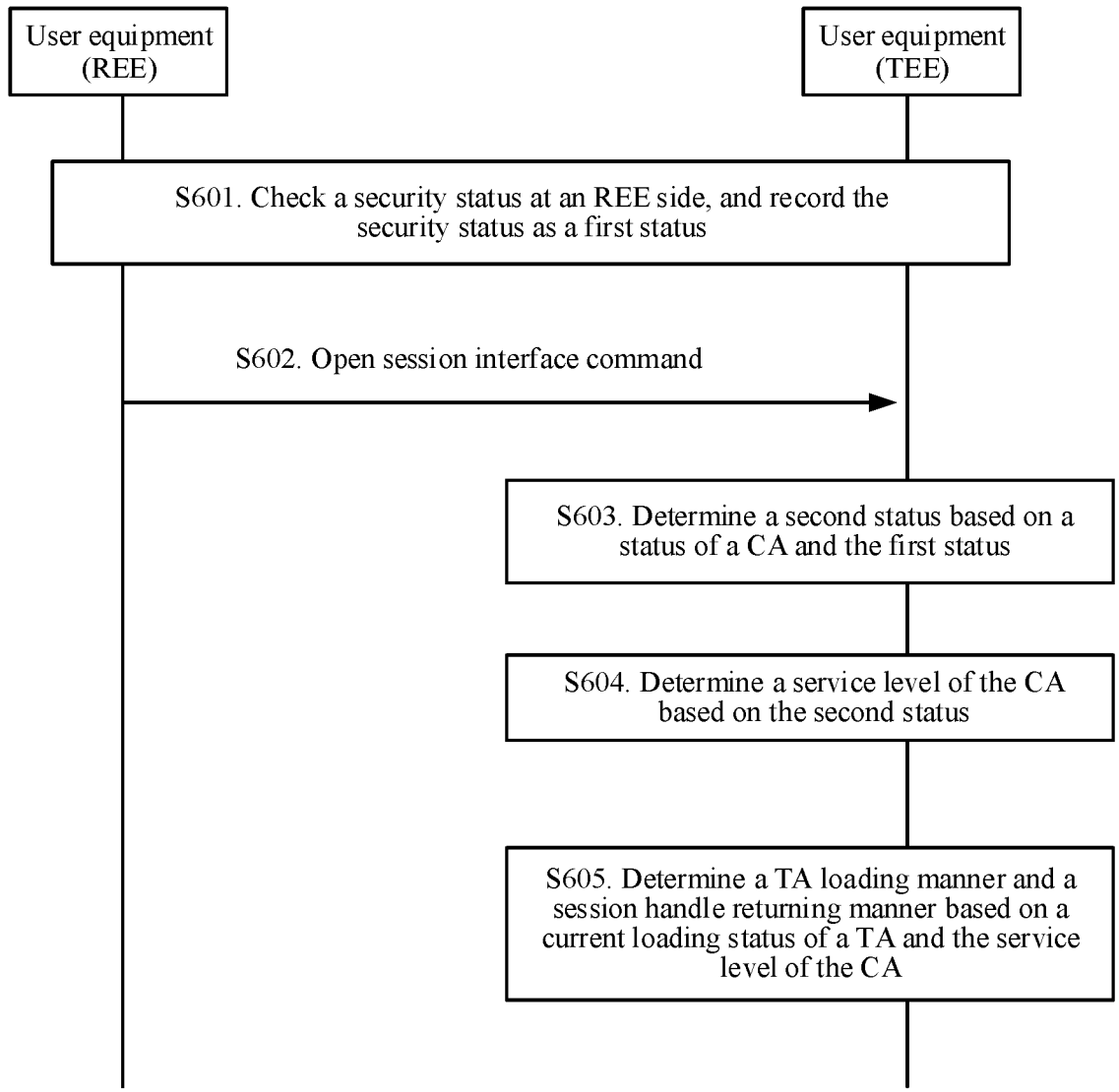
FIG. 6 is a schematic diagram of signaling interaction of another TA access control method according to an embodiment of this application.

FIG. 6 is a schematic diagram of signaling interaction of another TA access control method according to an embodiment of this application. As shown in FIG. 6, the method specifically includes the following operations.

S601. When user equipment starts, an access permission control module checks a security status of an REE side, and records the security status as a first status. The first status may be used to represent a security status of an REE. For example, when the security status of the REE is "secure", the first status may be security, or when the security status of the REE is "insecure", the first status may be insecurity.

The access permission control module may determine the security status of the REE based on a plurality of conditions.

For example, the access permission control module checks an REE boot procedure to confirm integrity of an REE operating system.

The access permission control module checks whether the REE has been rooted or was rooted.

The access permission control module checks whether a security monitoring module (for example, security software) based on the TEE and a security module on the REE side has detected that the REE side is attacked, or a malicious program exists on the REE side.

If at least one of the cases: the REE operating system is incomplete, the REE has been rooted or was rooted, the REE side is attacked, or a malicious program exists on the REE side occurs, the security status of the REE is considered as insecurity. In addition, a level of the security status of the REE side may be further distinguished, and more of the foregoing cases indicate a lower level.

The access permission control module may periodically perform the foregoing check to refresh a recorded security status of the REE.

S602. When the CA accesses the TA or accesses the TA by using an REE operating system service, the CA sends an open session interface command to the TEE of the terminal. A connection method parameter corresponding to the open session interface command is TEEC_LOGIN_Registered_APPLICATION.

S603. The access permission control module determines a security status of an invoker (CA). For example, the access permission control module detects whether the CA is in a user state or a kernel state, if the CA is in the user state, determines that the security status of the CA is "secure", or if the CA is in the kernel state, determines that the security status of the CA is "insecure" (or detects whether the CA is in a system directory). The access permission control module determines a second status based on the security status of the CA and the first status. The second status is a comprehensive evaluation on the security status of the CA and the security status of the REE. For example, if the security status of the CA is "secure", and the first status is "secure", the second status is "secure". If the security status of the CA is "insecure", and the first status is "insecure", the second status is "insecure". If the security status of the CA is "secure", and the first status is "insecure", or the security status of the CA is "insecure", and the first status is "secure", the second status is "weak secure".

S604. The access permission control module determines a service level of the CA based on the second status. For example, the access permission control module may predetermine a correspondence between a second status and a service level, and determine, based on the correspondence between a second status and a service level, a service level of a CA corresponding to the second status. With reference to Table 3 in the foregoing embodiment, if the second status is "secure", namely, both the security status of the CA and the security status of the REE are security, the service level of the CA is a first level; if the second security status is "weak secure", namely, the security status of the CA is "secure", and the first status is "insecure", or the security status of the CA is "insecure", and the first status is "secure", the service level of the CA is a second level.

S605. The user equipment checks, in the TEE, a current loading state of the TA, and determines a TA loading manner and a session handle returning manner based on the loading state of the TA and the service level of the CA.

Specifically, if the TA is loaded, and a service level that can be provided by the currently loaded TA is consistent with the service level of the CA, a session handle of the currently loaded TA is directly returned to the CA.

If the TA is not loaded, the TA is loaded based on the service level of the CA, and a session handle of the loaded TA is returned to the CA.

If the TA is loaded but cannot provide a service corresponding to the service level of the CA, the TA is reloaded based on the service level of the CA, and a session handle of a reloaded TA is returned to the CA. Alternatively, the same TA is started based on the service level of the CA, and a TA instance corresponding to a service level of another CA is maintained in the TEE.

In addition, a user may be notified of an available service level. In other words, a user is notified of the service level of the CA. When a service is limited, a method for improving the service level may be further prompted.

In this embodiment of this application, the service level of the CA may be determined with reference to the security status of the CA and the security status of the current REE, thereby effectively enhancing constraint and limitation of accessing the TA by the CA, reducing impact of attacking the TA by using the CA when the REE is attacked, and improving security of accessing the TA by the CA.

Figure 7:
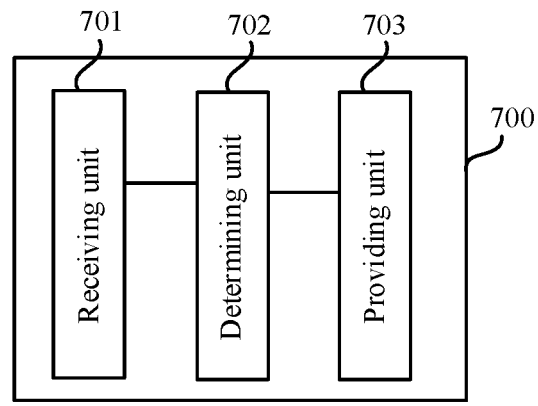
FIG. 7 is a schematic structural diagram of a terminal according to an embodiment of this application.

FIG. 7 is a schematic structural diagram of a terminal according to an embodiment of this application. As shown in FIG. 7, the terminal 700 includes:

a receiving unit 701, configured to receive, in a trusted execution environment TEE, a request for accessing a target TA that is sent by a CA;

a determining unit 702, configured to determine a service level of the CA in the TEE based on the request for accessing the target TA; and a providing unit 703, configured to provide, in the TEE by using the target TA, a service corresponding to the service level for the CA.

In one embodiment, the request for accessing the target TA includes a connection method parameter, and the connection method parameter is a registered application program.

In one embodiment, the receiving unit 701 is further configured to receive, in the TEE, an access rule sent by a server, where the access rule includes a correspondence between a CA identifier and a service level.

In one embodiment, the determining unit 702 is specifically configured to determine the CA identifier based on the request for accessing the target TA; and determine the service level of the CA based on the correspondence between a CA identifier and a service level.

In one embodiment, the request for accessing the target TA includes a connection data parameter, and the determining unit 702 is specifically configured to:

obtain, in the TEE, the CA identifier in process data space of the CA, where the process data space is process data space in which a CA process is started, and the CA is read after a user identity is authenticated, and the connection data parameter includes a process data space address;

obtain, in the TEE, the CA identifier included in the connection data parameter, where the connection data parameter includes the CA identifier; or obtain the CA identifier in the TEE based on a packet name of the CA, where the connection data parameter includes the packet name of the CA.

In one embodiment, the determining unit 702 is specifically configured to:

determine, in the TEE, a security status of a current REE corresponding to the request for accessing the target TA and a security status of the CA; and determine, in the TEE, the service level of the CA based on the security status of the REE and the security status of the CA.

In one embodiment, the security status includes "secure" or "insecure".

In one embodiment, the providing unit 703 is specifically configured to:

load, in the TEE, the target TA corresponding to the service level of the CA, create a session handle of the target TA, and return the session handle to the CA, so that the CA accesses the target TA by using the session handle of the target TA.

In one embodiment, the providing unit 703 is specifically configured to load, in the TEE, the target TA based on a loading state of the target TA and the service level of the CA.

The terminal 700 may be used as a terminal performing the trusted application access control method described in FIG. 3 to FIG. 6, and performs the operations performed by the terminal in FIG. 3 to FIG. 6. This enhances constraint and limitation of accessing the TA by the CA, reduces impact of attacking the TA by using the CA when the REE is attacked, and improves security of accessing the TA by the CA.

Figure 8:
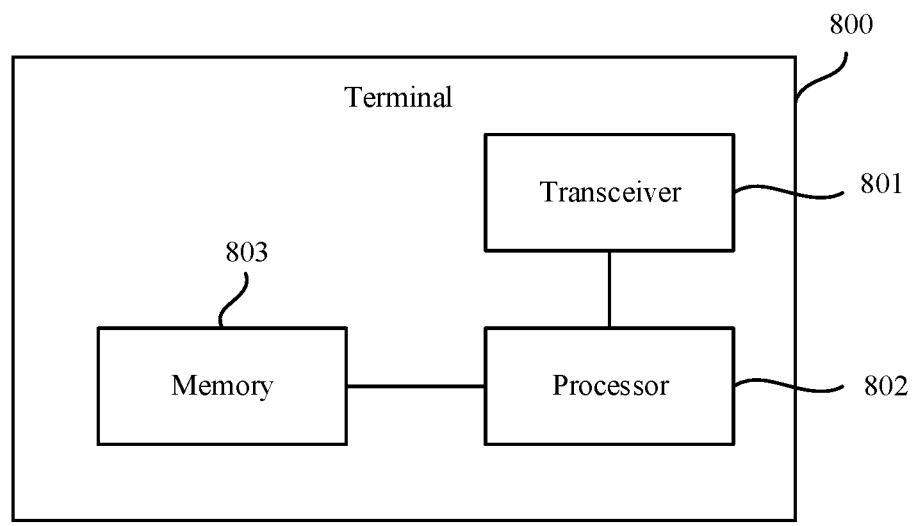
FIG. 8 is a schematic structural diagram of another terminal according to an embodiment of this application.

FIG. 8 is a schematic structural diagram of another terminal according to an embodiment of this application. As shown in FIG. 8, the terminal 800 includes a transceiver 801, a processor 802, and a memory 803. The transceiver 801 is configured to receive data of a data bus. The memory 803 is configured to store a program and data. The processor 802 is configured to execute the program stored in the memory 803 and read the data stored in the memory 803, so as to perform the operations performed by the terminal in FIG. 3 to FIG. 6. The terminal in this embodiment of this application may include at least two states: an REE and a TEE, and the terminal may be switched between the REE and the TEE.

Specifically, the transceiver 801 is configured to receive, in the TEE, a request for accessing a target TA that is sent by a CA;

the processor 802 is configured to determine a service level of the CA in the TEE; and the processor 802 is configured to provide, in the TEE by using the target TA, a service corresponding to the service level for the CA.

In one embodiment, the request for accessing the target TA includes a connection method parameter, and the connection method parameter is a registered application program.

In one embodiment, the transceiver 801 is further configured to receive, in the TEE, an access rule sent by a server, where the access rule includes a correspondence between a CA identifier and a service level.

In one embodiment, the processor 802 is specifically configured to determine the CA identifier in the TEE based on the request for accessing the target TA; and determine the service level of the CA in the TEE based on the correspondence between a CA identifier and a service level.

In one embodiment, the request for accessing the target TA includes a connection data parameter, and the processor 802 is further configured to: obtain, in the TEE, the CA identifier in process data space of the CA, where the process data space is process data space in which a CA process is started, and the CA is read after a user identity is authenticated, and the connection data parameter includes a process data space address; or obtain, in the TEE, the CA identifier included in the connection data parameter, where the connection data parameter includes the CA identifier; or obtain the CA identifier in the TEE based on a packet name of the CA, where the connection data parameter includes the packet name of the CA.

In one embodiment, the processor 802 is specifically configured to determine, in the TEE, a security status of a current REE corresponding to the request for accessing the target TA and a security status of the CA; and determine, in the TEE, the service level of the CA based on the security status of the REE and the security status of the CA.

In one embodiment, the security status includes "secure" or "insecure".

In one embodiment, the processor 802 is specifically configured to load, in the TEE, the target TA corresponding to the service level of the CA, create a session handle of the target TA, and return the session handle to the CA, so that the CA accesses the target TA by using the session handle of the target TA.

In one embodiment, the processor 802 is specifically configured to load, in the TEE, the target TA based on a loading state of the target TA and the service level of the CA.

The terminal 800 may be used as a terminal performing the trusted application access control method described in FIG. 3 to FIG. 6, and performs the operations performed by the terminal in FIG. 3 to FIG. 6. This enhances constraint and limitation of accessing the TA by the CA, reduces impact of attacking the TA by using the CA when the REE is attacked, and improves security of accessing the TA by the CA.

An embodiment of this application provides a chip apparatus, where the chip apparatus includes a processing unit and a storage unit. The storage unit is configured to store a program; and the processing unit runs the program to perform the methods and/or operations in FIG. 3 to FIG. 6.

An embodiment of this application provides a chip apparatus, where the chip apparatus includes a processor and a memory. The memory is configured to store a program; and the processor runs the program to perform the methods and/or operations in FIG. 3 to FIG. 6.

In this embodiment of the present invention, the chip apparatus may be a chip that runs the TEE in a terminal, and the chip includes a processing unit and a communications unit. The processing unit may be, for example, a processor, and the processor may be various types of processors described above. The communications unit may be, for example, an input/output interface, a pin, or a circuit, and the communications unit includes a system bus. In one embodiment, the chip further includes a storage unit, and the storage unit may be a memory inside the chip, for example, a register, a cache, a random access memory (RAM), an EEPROM, or a FLASH. The storage unit may further be a memory located outside the chip, and the memory may be various types of processors described above. The processor is connected to the memory, and the processor may run an instruction stored in the memory, so that the chip apparatus executes the methods shown in FIG. 3 to FIG. 6.

All or some of the foregoing embodiments of the present invention may be implemented through software, hardware, firmware, or any combination thereof. When software is used to implement the embodiments, the embodiments may be implemented all or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for trusted application access control, comprising:

receiving, by a terminal in a trusted execution environment (TEE), a request for accessing a target trusted application (TA) from a client application (CA);

determining, by the terminal, a CA identifier in the TEE based on the request for accessing the target TA;

determining, by the terminal in the TEE, a service level of the CA based on a correspondence between the CA identifier and the service level of the CA; and providing, by the terminal in the TEE by using the target TA, a service corresponding to the service level for the CA, including loading the target TA corresponding to the service level of the CA, creating a session handle of the target TA, and returning the session handle, wherein the session handle is used by the CA to access the target TA.

2. The method according to claim 1, wherein the request for accessing the target TA comprises a connection method parameter, and wherein the connection method parameter is a registered application program.

3. The method according to claim 1, wherein before the receiving, by a terminal in a TEE, a request for accessing a target TA that is sent by a CA, the method further comprises:
receiving, by the terminal in the TEE, an access rule sent by a server, wherein the access rule comprises a correspondence between the CA identifier and the service level.

4. The method according to claim 1, wherein the request for accessing the target TA comprises a connection data parameter, and wherein the determining, by the terminal, the CA identifier based on the request for accessing the target TA comprises any one of the following:
obtaining, by the terminal in the TEE, the CA identifier in process data space of the CA, wherein the process data space is process data space in which a CA process is started, and the CA is read after a user identity is authenticated, and the connection data parameter comprises a process data space address;
obtaining, by the terminal in the TEE, the CA identifier comprised in the connection data parameter, wherein the connection data parameter comprises the CA identifier; or
obtaining, by the terminal, the CA identifier in the TEE based on a packet name of the CA, wherein the connection data parameter comprises the packet name of the CA.

5. The method according to claim 1, wherein the loading, by the terminal in the TEE, the target TA corresponding to the service level of the CA comprises:
loading, by the terminal in the TEE, the target TA based on a loading status of the target TA and the service level of the CA.

6. The method according to claim 1, wherein the service comprises a video service.

7. An apparatus, comprising:
at least one processor; and
a memory coupled to the at least one processor and configured to store programming instructions that, when executed by the at least one processor, cause the apparatus to perform operations comprising:
receiving, in a trusted execution environment (TEE), a request for accessing a target trusted application (TA) from a client application (CA);
determining a CA identifier in the TEE based on the request for accessing the target TA;
determining, in the TEE, a service level of the CA based on a correspondence between the CA identifier and the service level of the CA; and
providing, in the TEE by using the target TA, a service corresponding to the service level for the CA, including loading the target TA corresponding to the service level of the CA, creating a session handle of the target TA, and returning the session handle, wherein the session handle is used by the CA to access the target TA.

8. The apparatus according to claim 7, wherein the request for accessing the target TA comprises a connection method parameter, and where the connection method parameter is a registered application program.

9. The apparatus according to claim 7, wherein the operations further comprise:
receiving, in the TEE, an access rule sent by a server, wherein the access rule comprises a correspondence between the CA identifier and the service level.

10. The apparatus according to claim 7, wherein the request for accessing the target TA comprises a connection data parameter, and wherein the determining the CA identifier based on the request for accessing the target TA comprises any one of the following:
obtaining, in the TEE, the CA identifier in process data space of the CA, wherein the process data space is process data space in which a CA process is started, and the CA is read after a user identity is authenticated, and the connection data parameter comprises a process data space address;
obtaining, in the TEE, the CA identifier comprised in the connection data parameter, wherein the connection data parameter comprises the CA identifier; or
obtaining the CA identifier in the TEE based on a packet name of the CA, wherein the connection data parameter comprises the packet name of the CA.

11. The apparatus according to claim 7, wherein the loading, in the TEE, the target TA corresponding to the service level of the CA comprises:
loading, in the TEE, the target TA based on a loading status of the target TA and the service level of the CA.

12. The apparatus according to claim 7, wherein the service comprises a video service.

13. A non-transitory computer-readable storage medium having computer-readable program code stored therein that, in response to execution by a processor of an apparatus, cause the apparatus to perform operations comprising:
receiving, in a trusted execution environment (TEE), a request for accessing a target trusted application (TA) from a client application (CA);
determining a CA identifier in the TEE based on the request for accessing the target TA;
determining, in the TEE, a service level of the CA based on a correspondence between the CA identifier and the service level of the CA; and
providing, in the TEE by using the target TA, a service corresponding to the service level for the CA, including loading the target TA corresponding to the service level of the CA, creating a session handle of the target TA, and returning the session handle, wherein the session handle is used by the CA to access the target TA.

14. The non-transitory computer-readable storage medium according to claim 13, wherein the request for accessing the target TA comprises a connection method parameter, and wherein the connection method parameter is a registered application program.

15. The non-transitory computer-readable storage medium according to claim 13, wherein the operations further comprise:
receiving, in the TEE, an access rule sent by a server, wherein the access rule comprises a correspondence between the CA identifier and the service level.

16. The non-transitory computer-readable storage medium according to claim 13, wherein the request for accessing the target TA comprises a connection data parameter, and wherein the determining the CA identifier based on the request for accessing the target TA comprises any one of the following:
- obtaining, in the TEE, the CA identifier in process data space of the CA, wherein the process data space is process data space in which a CA process is started, and the CA is read after a user identity is authenticated, and the connection data parameter comprises a process data space address;
- obtaining, in the TEE, the CA identifier comprised in the connection data parameter, wherein the connection data parameter comprises the CA identifier; or
- obtaining the CA identifier in the TEE based on a packet name of the CA, wherein the connection data parameter comprises the packet name of the CA.

17. The non-transitory computer-readable storage medium according to claim 13, wherein the loading, in the TEE, the target TA corresponding to the service level of the CA comprises:
- loading, in the TEE, the target TA based on a loading status of the target TA and the service level of the CA.

* * * * *